(12) United States Patent
Lee

(10) Patent No.: US 9,420,823 B2
(45) Date of Patent: Aug. 23, 2016

(54) ROOM TEMPERATURE DRYING SYSTEM

(76) Inventor: Shang-Yo Lee, Taipei (TW)

( * ) Notice: Subject to any disclaimer, the term of this patent is extended or adjusted under 35 U.S.C. 154(b) by 113 days.

(21) Appl. No.: 14/415,135

(22) PCT Filed: Jul. 18, 2012

(86) PCT No.: PCT/CN2012/078792
§ 371 (c)(1),
(2), (4) Date: Feb. 12, 2015

(87) PCT Pub. No.: WO2014/012223
PCT Pub. Date: Jan. 23, 2014

(65) Prior Publication Data
US 2015/0173412 A1    Jun. 25, 2015

(51) Int. Cl.
| F26B 9/00 | (2006.01) |
| A23L 3/40 | (2006.01) |
| F26B 9/06 | (2006.01) |
| F26B 21/02 | (2006.01) |
| F26B 21/04 | (2006.01) |
| F26B 21/10 | (2006.01) |
| F26B 25/06 | (2006.01) |
| F26B 25/14 | (2006.01) |
| F26B 25/16 | (2006.01) |

(52) U.S. Cl.
CPC ... *A23L 3/40* (2013.01); *F26B 9/06* (2013.01); *F26B 21/02* (2013.01); *F26B 21/04* (2013.01); *F26B 21/10* (2013.01); *F26B 25/06* (2013.01); *F26B 25/14* (2013.01); *F26B 25/16* (2013.01)

(58) Field of Classification Search
CPC ............... F26B 3/00; F26B 5/00; F26B 9/00; A23L 3/00; A23L 3/40; H05K 7/00; H05K 7/20

USPC .......... 34/201, 210, 218; 164/56 R, 112, 165; 110/244, 246; 165/177, 104.24; 62/94
See application file for complete search history.

(56) References Cited

U.S. PATENT DOCUMENTS

| 2,296,771 A * | 9/1942 | Crawford | B61B 13/122 104/138.1 |
| 2,718,711 A * | 9/1955 | Kendall | D06F 58/22 34/604 |
| 3,656,491 A * | 4/1972 | Ballard | C23G 3/00 134/112 |

(Continued)

FOREIGN PATENT DOCUMENTS

| DE | 102008039747 A1 * | 3/2010 | ............ F24J 3/00 |
| GB | 2263760 A * | 8/1993 | ............ F25D 3/125 |

*Primary Examiner* — Stephen M Gravini
(74) *Attorney, Agent, or Firm* — Hannah M. Tien

(57) ABSTRACT

The invention relates to a room temperature drying system, mainly comprising: an inner drying chamber, an outer chamber with temperature difference, more than one dry article trolleys placed in the inner drying chamber, an air-conditioning device set on the wall in the outer chamber with temperature difference. The temperature of the inner drying chamber is controlled by the air-conditioning device at 2 degrees Celsius higher than that of the outer chamber with temperature difference, and because the warm air flow of the heating component in the inner drying chamber blows to the wet articles to be dried and the higher air humidity in the inner drying chamber, moisture will be condensed on the cooler metal circumferential wall and the metal top wall, the condensed water drops along the inner wall of the metal circumferential wall and the metal top wall into the water-expelling slot and is in turn discharged, thereby achieving the purpose of drying the articles intended to be dried.

11 Claims, 5 Drawing Sheets

(56) References Cited

U.S. PATENT DOCUMENTS

| | | | | |
|---|---|---|---|---|
| 4,409,775 A | * | 10/1983 | Brody | A23B 7/10 134/152 |
| 4,554,933 A | * | 11/1985 | Neville | A24B 3/06 131/304 |
| 4,785,552 A | * | 11/1988 | Best | F26B 3/305 34/418 |
| 4,969,509 A | * | 11/1990 | Merensky | B64D 13/08 165/104.34 |
| 5,305,533 A | * | 4/1994 | Alexander | F26B 11/028 34/108 |
| 6,115,939 A | * | 9/2000 | Kuster | F26B 15/04 34/194 |
| 7,089,683 B1 | * | 8/2006 | Plestenjak | F26B 21/02 34/209 |
| 7,513,061 B2 | * | 4/2009 | Hirayama | C02F 11/12 110/244 |
| 8,196,310 B2 | * | 6/2012 | McMahon | F26B 21/10 156/220 |
| 8,438,750 B2 | * | 5/2013 | Dittmer | D06F 58/22 134/10 |
| 2011/0232124 A1 | * | 9/2011 | Shivvers | F26B 3/205 34/428 |
| 2015/0173412 A1 | * | 6/2015 | Lee | F26B 9/06 34/218 |

* cited by examiner

Figure 1 well-known drying technology

Figure 2 well-known drying technology

ROOM TEMPERATURE DRYING SYSTEM

CROSS-REFERENCES TO RELATED APPLICATIONS

The Application is the national stage of PCT international Application No. PCT/CN2012/078792 filed on Jul. 18, 2012.

FIELD OF THE INVENTION

The present invention is directed to a room temperature drying system. In particular, the present invention is directed to a system of drying an article to be dried under room temperature so that the metal circumferential and the top walls in the system could be washed by water, and an elevated layer installed in the inner chamber in the system evacuates water to perform more effective drying.

BACKGROUND OF THE INVENTION

Since ancient times, people edible items have kinds of way to preserve edible items, but main ways such as dried and pickled, etc., to preserve food. In current life, refrigerators are used to keep edible items. The purpose of "drying" does not only provide longer storage time for items but also better quality for original characteristics of preserved items.

Referred to FIGS. 1 and 2 of Taiwan Patent No. 534305, FIG. 1 is three dimensional illustration of a known drying technology. FIG. 2 is a top view illustration of a known drying technology. The patent entitled "HERMETIC DRYER HAVING HIGH EFFICIENCY OF DEHUMIDIFICATION" provides a device for drying matters, mainly having a closed machine body to form an internal air circulation flow; a drying room 1' with a big space in the front part; two sides of the drying room 1' backward extending to a wind catheter pipe 2' with a smaller ventilation area; and a condensation warming system 3' in the back part, wherein the inner space of the drying room 1' can accommodate a trolley 11' with dry article to the inner space; temperature of internal space is setting according to the dry article, and gradually warming according to the drying process. As to the wind catheter pipe 2', its ventilation cut area is less than that of the drying room so as to provide the dried, hot and humid air with humidifying effect through the catheter. In addition, when the dried hot air is moved into a big space of drying room 2', relative humidity is reduced according to enlarged space, to dry the matter to be dried. The condensation warming system 3', located in the back side of the body, makes gas flowing through herein so as to produce dehumidification and warming effect. The condensation warming system 3' links an automatic control system 30'. According to the drying process, the sequential position of the condensation warming system 3' is an evaporator 31', a condensation device 32', a blower 33', a compressor 34' and a heater 35'. In the drying process, the blower 33' and the heater 35' by the automatic control system 30' automatically regulate flow temperature so that the inlet air into the drying room 1' reach the set temperature. Given the above, the hot and humid air from the drying room 1' is dehumidified by the evaporator 31'; then the dried cold air pass through the condenser 32'; is evacuating heated by the blower 33' and preheated; is heated and dried by heater 35' while recycling use; and reach the inner drying room 1' set stepwise heating according to the drying process, and control of the evaporator 31' maintain the dehumidification of the dew point temperature. In 2005, Luo Jun Jiang and Luo Qi sheng, provided an improved patent M277516 issued by 11 Oct. 2005 over the above Taiwan patent. However, the improvement is only made by increasing one condenser to three ones. The structure and the drying principle are still within the scope of the abovementioned Taiwan patent.

Although the above known drying technology can effectively dry the moisture of an article to reduce within the basic required range. In fact, it is often happen when the use of this device for drying, the moisture contained in the dried matter cannot reach the predetermined criteria. Finally, a user has to increase drying temperature. However, the elevated temperature often destroys properties (such as enzymes, etc.,) of the dried product to largely reduce the quality of the dried product. However, some people use low temperature for drying, i.e., frozen-drying. The physical characteristics of dried products being destroyed as well as poor drying efficiency are resulted in the differing expansion coefficients of dried products and water; and the volume of frozen water greater than that of unfrozen water under same weight according to well-known knowledge. In addition, frozen-drying must be evacuated to result in loss aroma of dried products.

Description of the Invention

The main object of the present invention provides a system of drying an article to be dried under room temperature so that the metal circumferential and top walls in the system could be washed by water, and an elevated layer installed in the inner chamber in the system evacuates water to perform more effective drying.

Another object of the present invention provides a room temperature drying system, comprising:

an inner drying chamber, having a metal top wall and a metal circumferential wall composed of a metallic material;

an outer chamber with temperature difference, placed outside of surrounding of the inner drying chamber, having a heat insulation circumferential wall of the outer chamber, for maintaining a temperature difference state between the inner drying chamber and the outer chamber with temperature difference;

a draining slot, placed on a ground within the inner drying chamber, for draining water to an outdoor of the inner drying chamber due to condensation of moisture on the metal circumferential wall and the metal top wall caused by the temperature difference;

an air-conditioning device, set inside the outer chamber with temperature difference, for maintaining the temperature difference state between the inner drying chamber and the outer chamber with temperature difference; and a plurality of dry article trolleys, placed in the inner drying chamber and having heating components, for heating the air blowing to articles to be dried.

The room temperature drying system according to the present invention, each of the plurality of dry article trolleys comprises a dry article layer, and a heating component layer used to generate warm air flow.

The room temperature drying system according to the present invention, a heating component layer comprises an air flow fan to generate the warm air flow.

The room temperature drying system according to the present invention, the metal circumferential wall and the metal top wall of the inner drying chamber are treated with a wave treatment, a water repellent treatment or a capillary surface treatment.

The room temperature drying system according to the present invention, the metal circumferential wall and the metal top wall of the inner drying chamber are made of stainless steel.

The room temperature drying system according to the present invention, a depression angle between the metal top wall and horizontal is between 5 degrees to 85 degrees.

The room temperature drying system according to the present invention, the temperature difference is between 2 degrees Celsius to 15 degrees Celsius.

The room temperature drying system according to the present invention, the system further comprises an elevated layer in the inner drying chamber for keeping the plurality of the dry article trolleys in a drained, dry state.

The room temperature drying system according to the present invention, the system further comprises a circulating fan, placed in the inner drying chamber for making the drying room consistent in temperature.

The room temperature drying system according to the present invention, the circumferential wall of the outer chamber and a roof of the outer chamber are provided with a heat insulation board.

The room temperature drying system according to the present invention, the time of heating and drying the article to be dried is from 10 to 48 hours.

REPRESENTATIVE OF THE MAJOR COMPONENT

Figure 1:
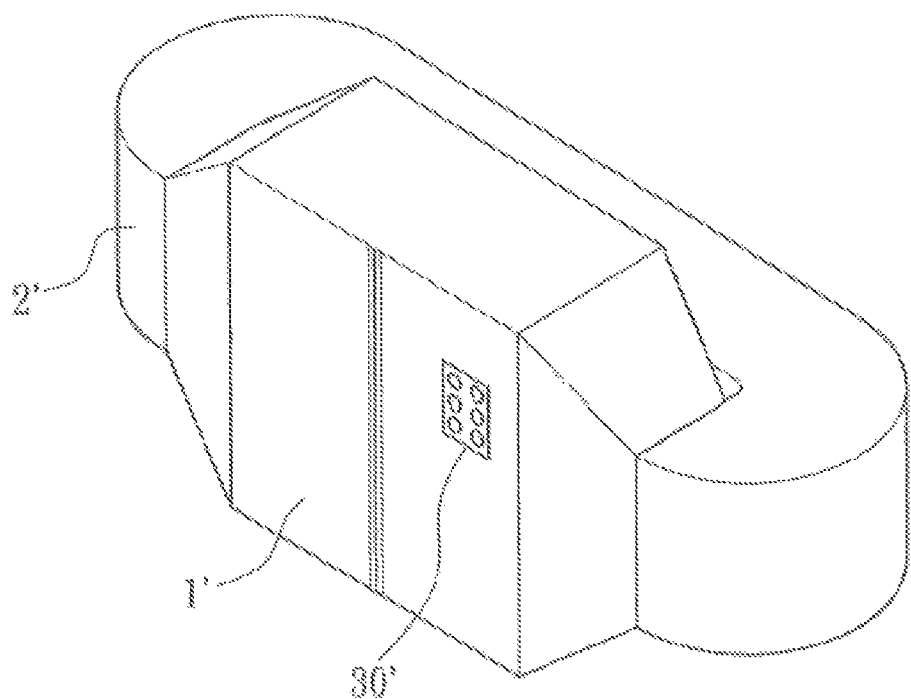
FIG. 1 shows a three dimensional schematic illustration of a known drying technology.
Figure 2:
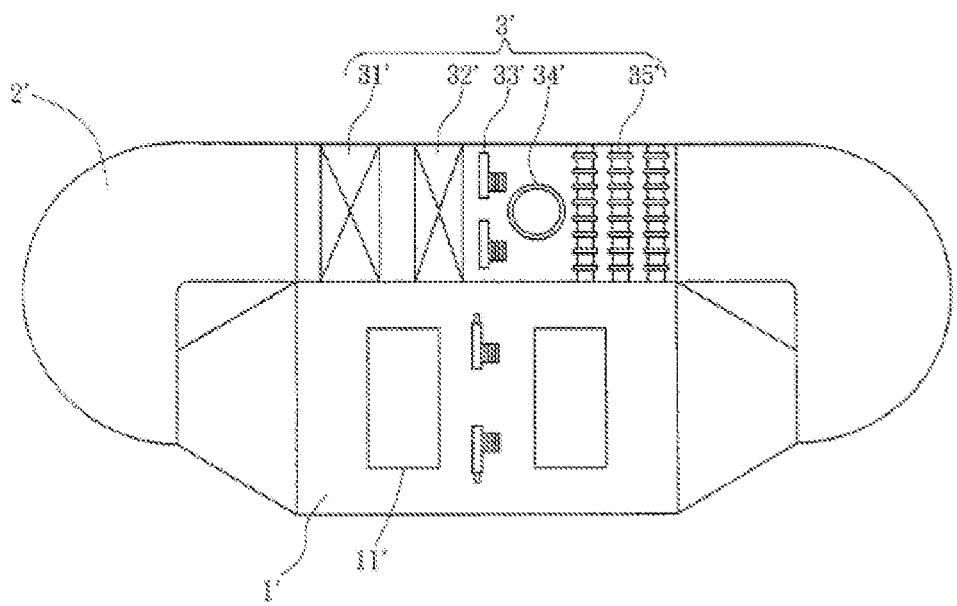
FIG. 2 shows a top view of the known drying technology.

1' . . . Drying room
11' . . . Trolley
2' . . . Wind catheter pipe
3' . . . Condensation warming system
30' . . . Automatic control system
31' . . . Evaporator
32' . . . Condenser
33' . . . Blower
34' . . . Compressor
35' . . . Heater
1 . . . Inner drying chamber
111 . . . Metal circumferential wall
112 . . . Metal top wall
121 . . . First dry article trolley
122 . . . Second dry article trolley
13 . . . Elevated layer
141 . . . Water-expelling or draining slot
15 . . . Circulating fan
2 . . . Outer chamber with temperature difference
211 . . . Circumferential wall of outer chamber
212 . . . Roof of outer chamber
22 . . . Air-conditioning device
3 . . . Outdoor

EMBODIMENTS OF THE INVENTION

Figure 3:
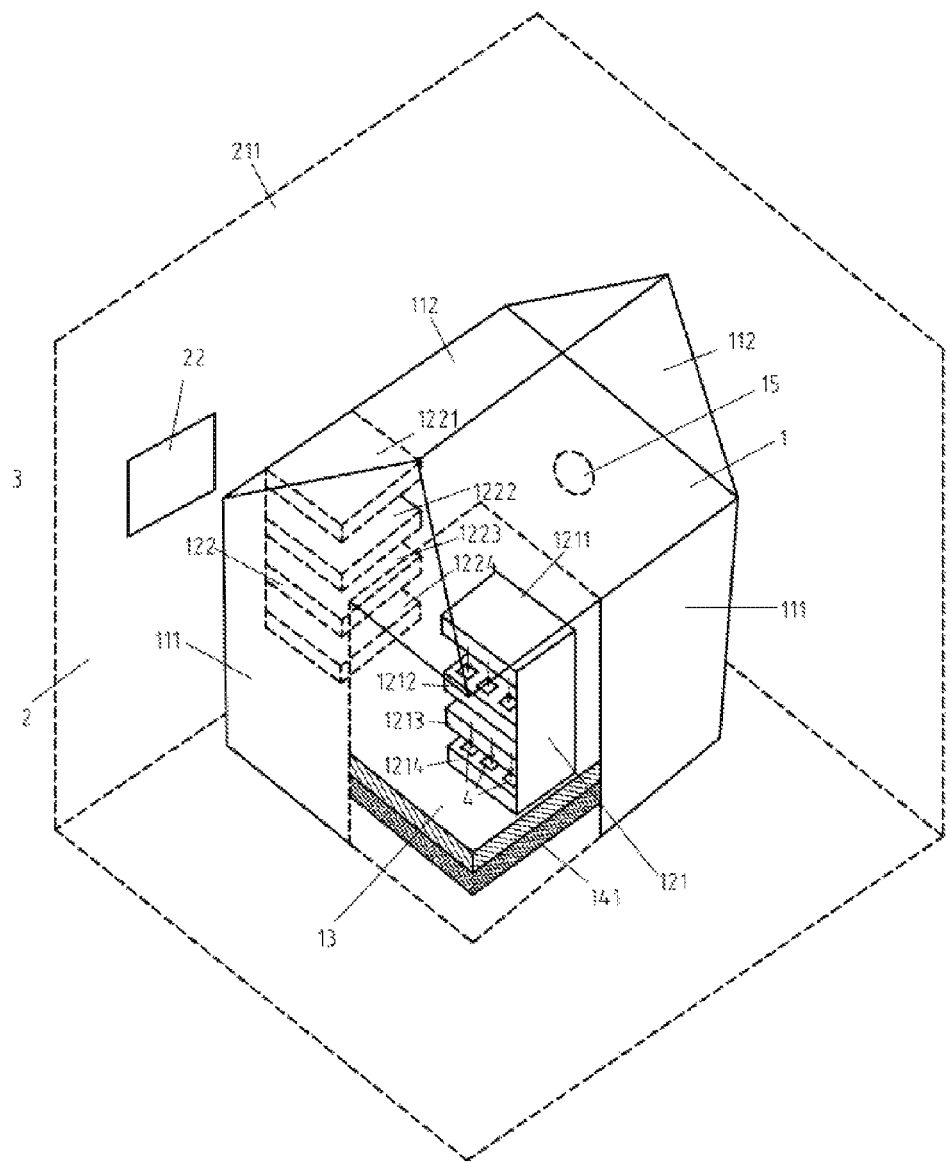
FIG. 3 shows a three dimensional schematic illustration of the room temperature drying system of the present invention.
Figure 4:
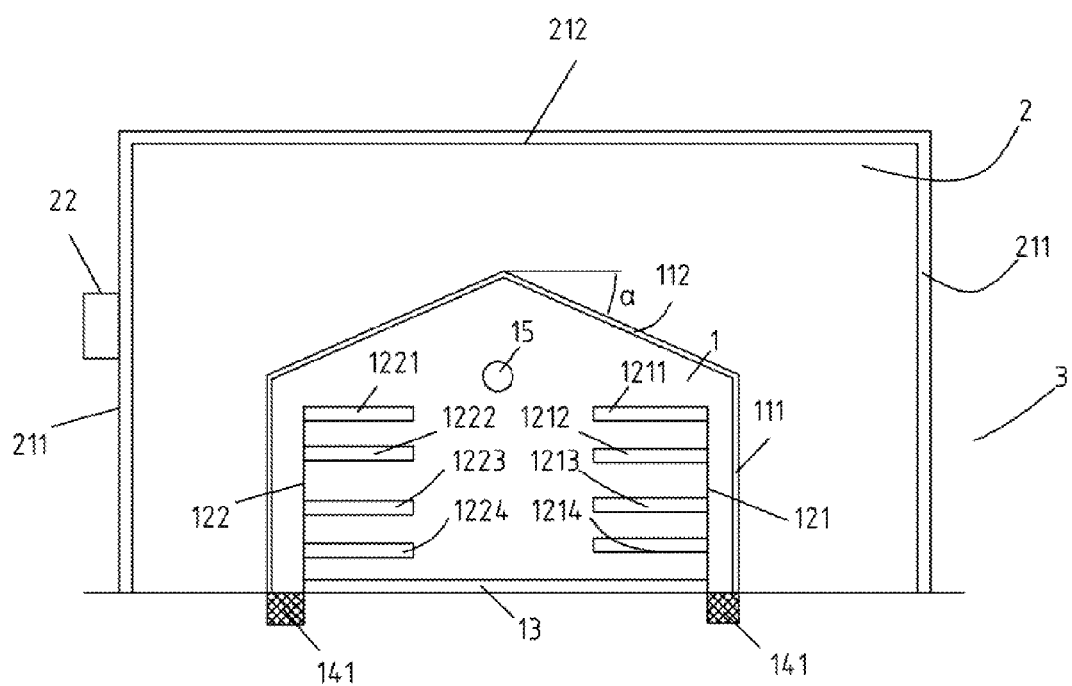
FIG. 4 shows a cross-sectional schematic illustration of the room temperature drying system of the present invention.

For the person skilled in the art to understand objects, features, and efficacy of the present invention, now with the following specific embodiments and the accompanying drawings, the present invention is described in detail as following:

Please refer to FIG. 3 to FIG. 5, in which FIG. 3 is a three dimensional schematic illustration of a room temperature drying system of the present invention and FIG. 4 is a cross-sectional schematic drawing of the room temperature drying system of the present invention. The invention relates to a room temperature drying system of a closed or nearly closed system, mainly comprising: an inner drying chamber 1, an outer chamber with temperature difference 2, a water-expelling slot or draining slot 141, more than one dry article trolleys 121,122 carrying articles to be dried and placed in the inner drying chamber 1, an air-conditioning device 22 located on the wall inside the outer chamber with temperature difference 2. The temperature of the inner drying chamber 1 is controlled by the air-conditioning device 22 at 2 degrees Celsius higher than that of the outer chamber with temperature difference 2, and because the warm air flow of the heating component in the inner drying chamber 1 blows to the wet articles to be dried and the higher air humidity in the inner drying chamber 1, moisture will be condensed on the cooler metal circumferential wall 111 and the metal top wall 112, the condensed water drops along the inner wall of the metal circumferential wall 111 and the metal top wall 112 into the water-expelling slot 141 and is in turn discharged, thereby achieving the purpose of drying the articles intended to be dried. The elevated layer 13 on the ground of the inner drying chamber 1 can slightly incline from back to front, from front to back, or from right to left, from left to right, or quaquversal from the highest center point of the elevated layer 13, thereby facilitating the water to flow into water-expelling slot 141 and to be discharged.

Figure 5A:
FIG. 5 shows a schematic illustration of the metal circumferential wall and metal top wall of the present invention.
Figure 5B:
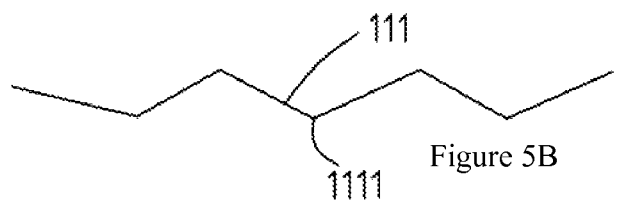
Figure 5C:
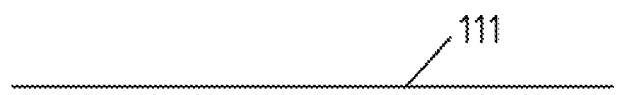
Figure 5D:
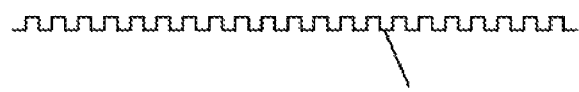

Please refer to FIG. 3 and FIG. 4. The inner drying chamber 1 has the metal circumferential wall 111 and the metal top wall 112, both of them being made of stainless steel, one water-expelling slot 141 around the elevated layer 13, two dry article trolleys 121,122, and one circulating fan 15. The metal circumferential wall 111 and the metal top wall 112 may be made of various metals and alloys, or even plastic to reduce costs. The metal circumferential wall 111 and the metal top wall 112, as shown in FIG. 5A to FIG. 5D, are treated with a wave treatment, a water repellent treatment, or a capillary surface treatment, in which the wave treatment forms in a circular arc shape or a triangular wave. In FIG. 5B, water droplets will slide off and be aggregated at a tip 1111 of the metal top wall 112 and then the flow speed will be accelerated due to gravity, thereby improving draining capacity. The metal circumferential wall 111 and the metal top wall 112 are treated by a water repellent in order to produce water repellent effect on the surface for accelerating water draining. The metal top wall 112 may be formed in a triangular or circular shape. If it is in a triangle shape, the angle of depression a formed between the metal top wall 112 and the horizontal plane is between 5 degrees to 85 degrees.

The two dry article trolleys 121,122, respectively, are formed by two drying units, each drying unit has air flow fan layers (i.e., heating component layers) 1211, 1213, 1221, 1223, and dry article layers 1212, 1214, 1222, 1224, wherein the air flow fan layers 1211, 1213, 1221, 1223 are provided with a plurality of air flow fans to generate warm air flow (i.e., heating components layers), the generated warm air flow is blown to the dry articles 4 on the dry article layers 1212, 1214, 1222, 1224, the dry articles 4 are thus being dried. The time required for drying by heating is from 10 to 48 hours. The dry articles 4 can be tea, fruit, and any other articles needed to be dried. After drying, the two dry article trolleys 121,122 are push out through the door (not shown) and replaced with two new dry article trolleys to continue for drying. Air flow fan may blow from top to bottom or it may be installed to blow the warm air horizontally or in tilted positions.

The outer chamber with temperature difference 2 is placed outside of the inner drying chamber 1. The outer chamber with temperature difference 2 has the circumferential wall of outer chamber 211, the outer chamber roof 212, and an air-conditioning device 22 set on the circumferential wall of outer chamber 211 to maintain a temperature difference between the inner drying chamber 1 and the outer chamber with temperature difference 2 by installing a temperature sensor, respectively, in the inner drying chamber 1 and the outer chamber with temperature difference 2. A temperature controller of the air-conditioning device 22 controls the temperature difference. As to temperature of the outdoor 3, it is ignored.

The advantages and effects of the room temperature drying system of the present invention are: (1) high drying efficiency, (2) preserving excellent characteristics and quality of the dried article, (3) easy to use water to clean the metal circumferential wall and the metal top wall.

Therefore, the present invention provides a room temperature drying system, which is capable of maintaining continuous drying at room temperature to preserve good characteristics and quality of dried articles. Thus, the invention is nonobvious and meets the requirements for an invention patent. The above mention has a detailed description of the invention, however, the above, only the invention of the preferred embodiment, no limiting the scope of the present invention. That is within the range of the invention for equal change and modification, which all should still belong to the invention patents covering range.

What is claimed is:

1. A room temperature drying system, comprising:
   an inner drying chamber, having a metal top wall and a metal circumferential wall composed of a metallic material;
   an outer chamber with temperature difference, placed outside of surrounding of the inner drying chamber, having a heat insulation circumferential wall of the outer chamber, for maintaining a temperature difference state between the inner drying chamber and the outer chamber with temperature difference;
   a draining slot, placed on a ground within the inner drying chamber, for draining water to an outdoor of the inner drying chamber due to condensation of moisture on the metal circumferential wall and the metal top wall caused by the temperature difference;
   an air-conditioning device, set inside the outer chamber with temperature difference, for maintaining the temperature difference state between the inner drying chamber and the outer chamber with temperature difference; and
   a plurality of dry article trolleys, placed in the inner drying chamber and having heating components, for heating the air blowing to articles to be dried.

2. The room temperature drying system as described in claim 1, wherein each of the plurality of dry article trolleys comprises a dry article layer, and a heating component layer used to generate warm air flow.

3. The room temperature drying system as described in claim 2, wherein the heating component layer comprises an air fan to generate the warm air flow.

4. The room temperature drying system as described in claim 1, wherein the metal circumferential wall and the metal top wall of the inner drying chamber is treated with a wave treatment, a water repellent treatment or a capillary surface treatment.

5. The room temperature drying system as described in claim 4, wherein the metal circumferential wall and the metal top wall of the inner drying chamber is made of stainless steel.

6. The room temperature drying system as described in claim 5, wherein the metal top wall is in a shape of an arc or triangle, while the metal top wall is in a shape of triangle and a depression angle between the metal top wall and horizontal is between 5 degrees to 85 degrees.

7. The room temperature drying system as described in claim 1, wherein the temperature difference is between 2 degrees Celsius to 15 degrees Celsius.

8. The room temperature drying system as described in claim 1, further comprising an elevated layer in the inner drying chamber for keeping the plurality of trolleys in a drained, dry state, in which the elevated layer is inclined to facilitate draining.

9. The room temperature drying system as described in claim 1, further comprising a circulating fan, placed in the inner drying chamber for making the drying room consistent in temperature.

10. The room temperature drying system as described in claim 1, wherein the circumferential wall of the outer chamber with temperature difference and a roof of outer chamber with temperature difference are provided with heat insulation board.

11. The room temperature drying system as described in claim 1, wherein the time of heating and drying the articles to be dried is from 10 to 48 hours.

\* \* \* \* \*